(12) United States Patent
Ding et al.

(10) Patent No.: US 6,754,082 B1
(45) Date of Patent: Jun. 22, 2004

(54) DATA STORAGE SYSTEM

(75) Inventors: Jiangang Ding, San Jose, CA (US); Ji Zhang, San Jose, CA (US); Hain Ching Liu, Fremont, CA (US)

(73) Assignee: Exavio, Inc., Santa Clara, CA (US)

( * ) Notice: Subject to any disclaimer, the term of this patent is extended or adjusted under 35 U.S.C. 154(b) by 0 days.

(21) Appl. No.: 10/290,013

(22) Filed: Nov. 7, 2002

(51) Int. Cl.[7] ............................................... G06F 1/16
(52) U.S. Cl. ...................... 361/727; 361/685; 361/724; 312/223.1; 312/223.2
(58) Field of Search .............................. 361/685, 687, 361/695, 724, 727; 312/223.1, 223.2

(56) References Cited

U.S. PATENT DOCUMENTS 5,506,750 A * 4/1996 Carteau et al. ............. 361/685
6,392,892 B1 * 5/2002 Sobolewski et al. ........ 361/724
6,510,050 B1 * 1/2003 Lee et al. ................... 361/685

OTHER PUBLICATIONS

Quantum DX30 Product Data Sheet.

* cited by examiner

*Primary Examiner*—Darren Schuberg
*Assistant Examiner*—Anthony Q. Edwards

(57) ABSTRACT

A data storage system (30) includes multiple storage devices arranged in an array. A column in the array includes storage devices (12, 14, 16) mounted on a tray (22). The storage devices (12, 14, 16) and the tray (22) form an air channel (28) for efficient heat dissipation. The data storage system (30) may include multiple columns inserted in multiple slots of a chassis (35), thereby forming a memory board.

8 Claims, 5 Drawing Sheets

US 6,754,082 B1

DATA STORAGE SYSTEM

FIELD OF THE INVENTION

The present invention relates, in general, to data storage and, more particularly, to data storage system comprised of multiple data storage devices.

BACKGROUND OF THE INVENTION

The advances in computing technology and network infrastructure have provided opportunities for transmitting digital media of many forms at high speed. It might be economically feasible and efficient to store media content in one or more storage devices connected to a server and distribute the media content to clients over the network on a real-time or near real-time basis. For example, with the state of art digital compression technology, high quality continuous real-time video display can be maintained with digital video signal transmission rate as low as one megabit per second. Thus, it would be efficient to store digitized video programs on a centralized storage system and deliver the programs to clients, e.g., through Internet, satellite, compact disks, terrestrial broadcast, on an as needed or as requested basis.

A storage device or system server for storing and delivering the video programs requires a high digital data storage capacity. For example, one thousand hours of broadcast quality digital video program content, which is equivalent to about four hundred movies, compressed in accordance with a Motion Picture Experts Group (MPEG) format generally requires approximately one tera-bytes of storage space. Backup storage for preventing data loss will take comparable or even more storage space. To be commercially viable, a server with a centralized storage system may need to have several thousand movies and other video programs stored thereon and ready for delivery to clients on request over the network.

Large storage capacity can be achieved through a data storage system comprised of multiple storage devices. One approach of preventing the storage system from overheating is to attach the storage devices in the storage system to one or more large heat sinks such as, for example, aluminum blocks. Another approach is to arrange the storage devices in the storage system apart from each other and to provide sufficient airflow in the in the space between the storage devices. These approaches will significantly increase the bulkiness, i.e., size and/or weight, of the storage system. Reducing the number of the storage devices in the storage system running simultaneously may reduce the heat generation rate, thereby preventing the storage system from overheating. However, this will adversely affect the operating efficiency of the data storage system.

Accordingly, it would be advantageous to provide a data storage system that has a large data storage capacity and is compact and lightweight. It is desirable for the data storage system to have a high data access rate. It is also desirable for the data storage system to be reliable. It would be of further advantage for the data storage system to simple and inexpensive to operate.

SUMMARY OF THE INVENTION

In a general aspect, the present invention provides a data storage system that has a large data storage capacity. In a specific aspect, the data storage system in accordance with the present invention is compact and lightweight. In another specific aspect, the data storage system has a high data access rate. In various other specific aspects of the present invention, the data storage system in accordance with the present invention is simple, reliable, and/or cost efficient.

A data storage system in accordance with the present invention includes an array of data storage devices mounted on one or more trays. The storage devices on each tray form one column of the array. The array may include any number of columns of storage devices. In accordance with an embodiment of the present invention, each column of storage devices are attached to the two opposite sidewalls of a corresponding tray, with the bottoms or tops of the storage devices in close proximity to the floor of the tray. The bottoms or tops of the storage devices and the sidewalls and the floor of the tray form a narrow channel, through which air can flow. A fan is positioned on one end of the tray to generate airflow in the channel, thereby providing efficient cooling of the storage devices.

In accordance with a particular embodiment of the present invention, the tray is mounted on a chassis, on which various components of a data storage and access system, e.g., signal processing circuit, signal transmission circuit, power supply circuit, etc., are mounted. In an embodiment of the present invention where the array includes more than one column, the trays are substantially coplanar and parallel to each other when they are mounted on the chassis. Therefore, the data storage system includes data storage devices arranged in a two dimensional array. In an alternative embodiment, the trays are substantially parallel to each other and arranged into multiple layers. In this embodiment, the data storage system includes data storage devices arranged in a three dimensional array. The airflows in the channels can be generated by a single fan or a plurality of fans.

In accordance with a preferred embodiment of the present invention, the data storage system includes a plurality of hard disk drives mounted on a plurality of trays. The hard disk drives on each tray are substantially aligned and coplanar with each other. The trays with the hard disk drives mounted thereon have a thickness equal to or less than one rack unit (4.445 cm). Therefore, the columns of hard disk drives can slide into slots in a chassis that have a height of one rack unit. In one embodiment, the chassis has slots on a single layer. In another embodiment, the chassis has slots on multiple layers. The height of the data storage system is approximately equal to one rack unit multiplied by the number of layers. The length of the data storage system is substantially determined by the number of hard disks in each column of the array, and the width of the data storage system is substantially determined by the number of columns in the array. In yet another embodiment, the data storage system includes multiple chassis mounted on a rack, with each chassis having slots in a single layer.

By way of example, a data storage system in accordance with an embodiment of the present invention includes twelve hard disks mounted on four trays, there by forming a two dimensional array having four columns, with three hard disks in each column. The array has a dimension no greater than 45 cm in width, 50 cm in depth, and 4.5 cm in height. The array may be mounted on a chassis or a board with signal processing circuits, power supply circuits, cooling fans, etc, the whole board may have a depth of approximately 75 cm. With each hard disk having a memory of 160 giga-bytes (GB), the data storage board has a memory capacity of 1.92 tera-bytes (TB). A server for storing data such as, for example, video program content, may include several such data storage boards stacked on top of each other on a rack.

DETAILED DESCRIPTION OF VARIOUS EMBODIMENTS

Figure 1:
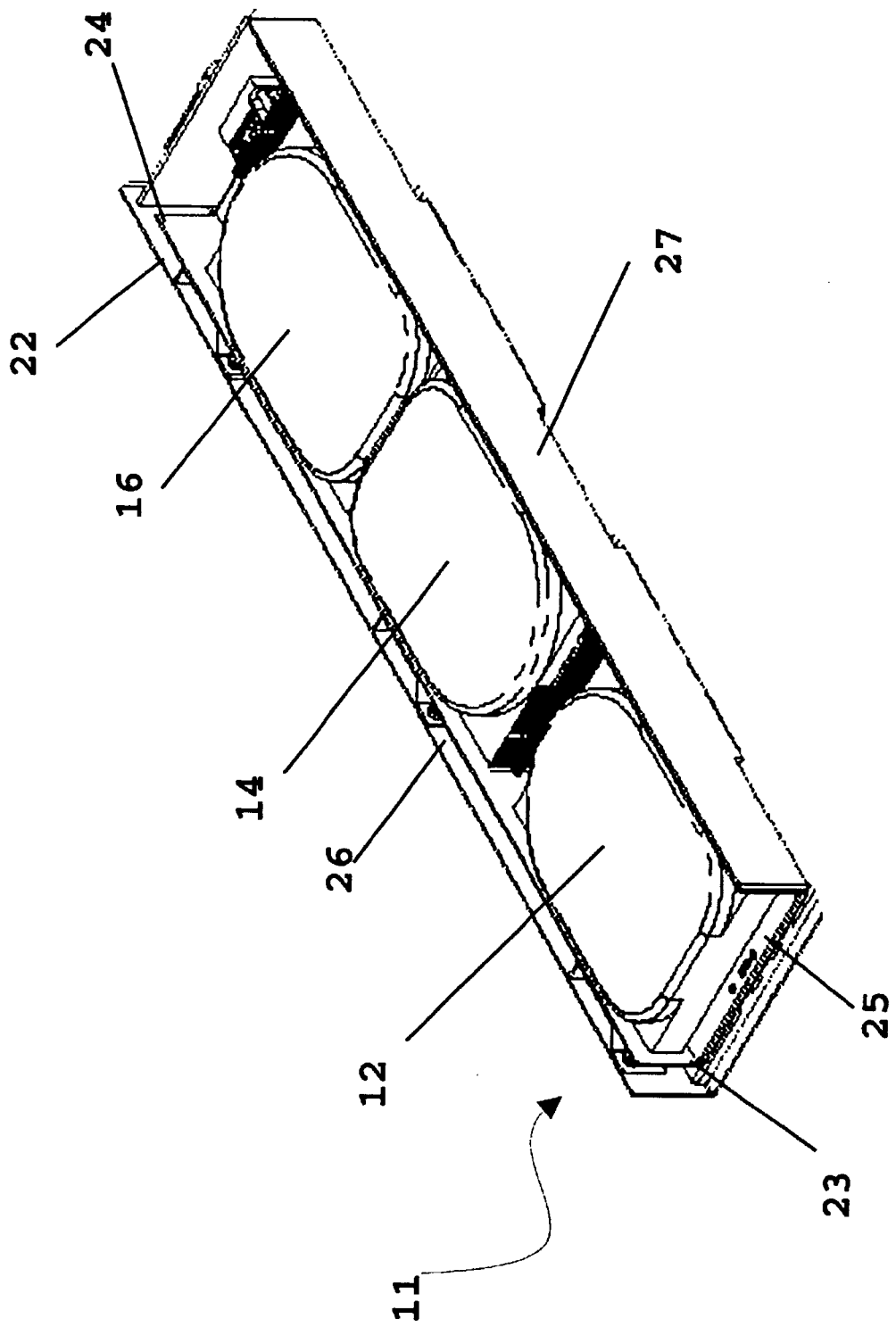
FIG. 1 illustrates an isometric view of a data storage system in accordance with the present invention.

Preferred embodiments of the present invention are described hereinafter with reference to the figures. It should be noted that the figures are not necessarily drawn to scale and elements of similar structures or functions are represented by like reference numerals throughout the figures. It should also be noted that the figures are only intended to facilitate the description of specific embodiments of the invention. They are not intended as an exhaustive description of the invention or as a limitation on the scope of the invention. In addition, an aspect described in conjunction with a particular embodiment of the present invention is not necessarily limited to that embodiment and can be practiced in any other embodiments of the present invention.

Figure 2:
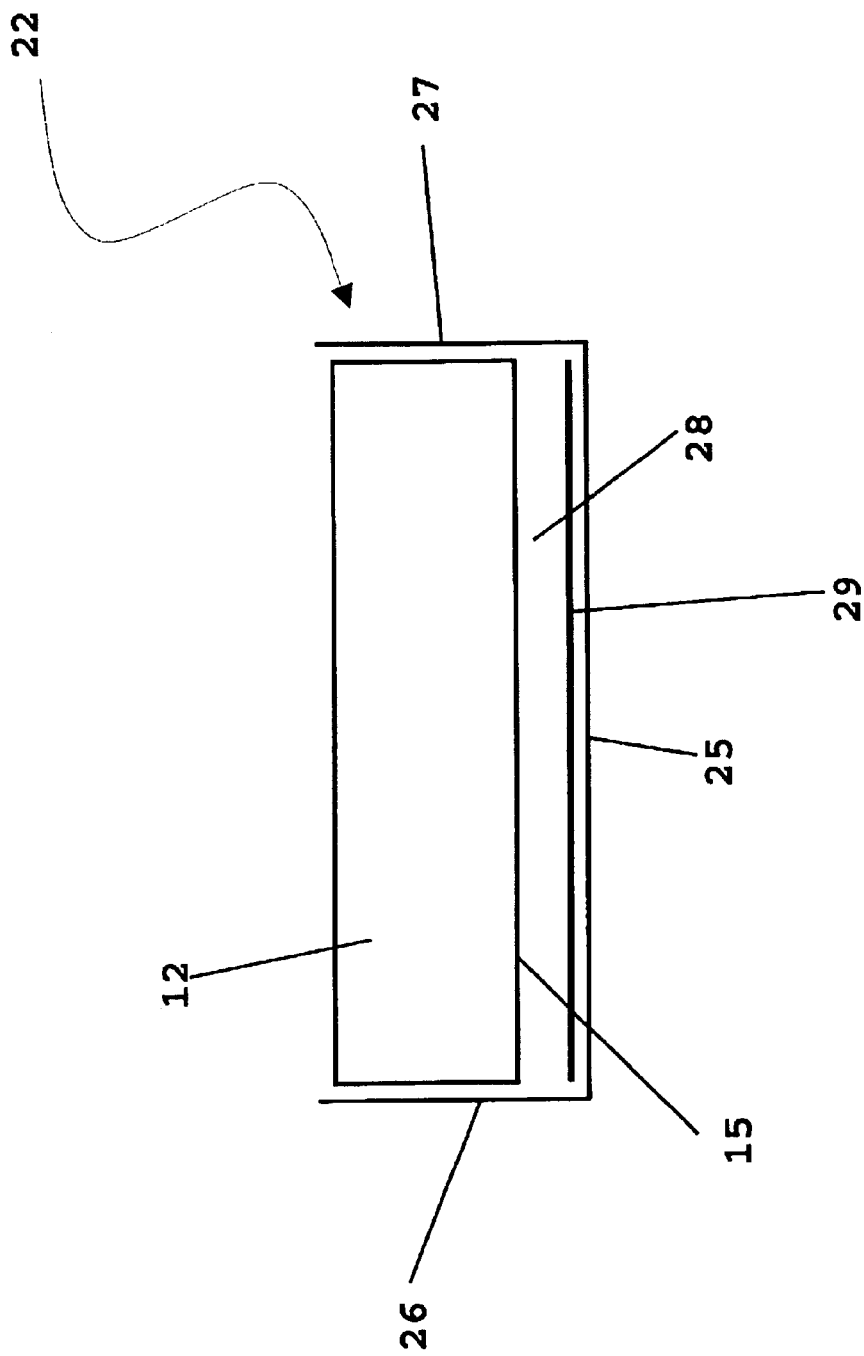
FIG. 2 illustrates a front view of the data storage system shown in FIG. 1.

FIGS. 1 and 2 illustrate an isometric view and a front view, respectively, of a data storage system 10 in accordance with an embodiment of the present invention. Data storage system 10 includes a set 11 of data storage devices 12, 14, and 16 arranged in an array and mounted on a tray 22. Tray 22 has a first end 23 and a second end 24, which are also referred to as a front end 23 and a back end 24, respectively, of tray 22. An elongated surface 25 extends from front end 23 to back end 24. Surface 25 is sometimes also referred to as a floor or a bottom of tray 22. Tray 22 also includes a first sidewall 26 and a second sidewall 27 opposite to each other and extending from front end 23 to back end 24. Set 11 of storage devices 12, 14, and 16 are mounted between sidewalls 26 and 27 of tray 22. Each of storage devices 12, 14, and 16 has a major surface, which may be a bottom or a top thereof, in close proximity with floor 25 of tray 22. FIG. 2 shows a major surface 15 of storage device 12 in close proximity with floor 25 of tray 22. Mounted on tray 22, storage devices 12, 14, and 16 are substantially coplanar with each other. Their major surfaces define an air channel 28 (shown in FIG. 2) with sidewalls 23 and 24 and floor 25 of tray 22.

Data transmission lines (not shown in FIGS. 1 and 2) are coupled to storage devices 12, 14, and 16 for transmitting data to and from data storage system 10. A power supply circuit (not shown in FIGS. 1 and 2) provides the operating power to data storage system 10. An airflow generator (not shown in FIGS. 1 and 2) generates an airflow in air channel 28, thereby preventing data storage system 10 from overheating during operation. In accordance with a preferred embodiment of the present invention, the airflow generator is a suction fan mounted adjacent back end 24 of tray 22. It generates an airflow flowing in air channel 28 from front end 23 to back end 24. Furthermore, the power supply circuit can be mounted in the path of the airflow. Therefore, the airflow also flows through the power supply circuit and dissipates heat generated therein.

In accordance with a specific embodiment of the present invention, storage devices 12, 14, and 16 are hard disk drives. A hard disk drive is usually no larger than approximately 15 centimeters (cm) long, 10 cm wide, and 3 cm high. In one embodiment, data storage system 10 is formed by aligning hard disk drives 12, 14, and 16 longitudinally or lengthwise between front end 23 and back end 24 and attaching them to sidewalls 26 and 27 of tray 22. Air channel 28 may have a height of approximately 0.3 cm measured from floor 25 of tray 22 to the bottoms of hard disk drives 12, 14, and 16. Thus, data storage system 10 has a dimension no greater than approximately 48 cm in length, 11 cm in width, and 3.5 cm in height. Limiting the height of data storage system 10 to no greater than 4.445 cm is beneficial because this will allow data storage system 10 to be mounted into a standardized slot of one rack unit (RU) in height. The small cross sectional area, e.g., 11 cm ×0.3 cm, of air channel 28 is beneficial in generating a high speed airflow therein, thereby increasing the heat dissipation efficient of the airflow.

It should be understood that the structure of data storage system 10 in accordance with the present invention is not limited what is described herein above with reference to FIGS. 1 and 2. For example, storage devices 12, 14, and 16 are not limited to being hard disk drives. Storage devices 12, 14, and 16 may include any kind of data storage devices or medium, e.g., tape drives, compact disk (CD) drives, digital video disk (DVD) drives, mini disk (MD) drives, etc. In addition, storage device set 11 is not limited to include three storage devices as shown in FIG. 1. Depending on the sizes of the storage devices in set 11 and desired dimension of tray 22 in system 10, set 11 may include any number of storage devices, e.g., one, two, four, five, etc.

Figure 3:
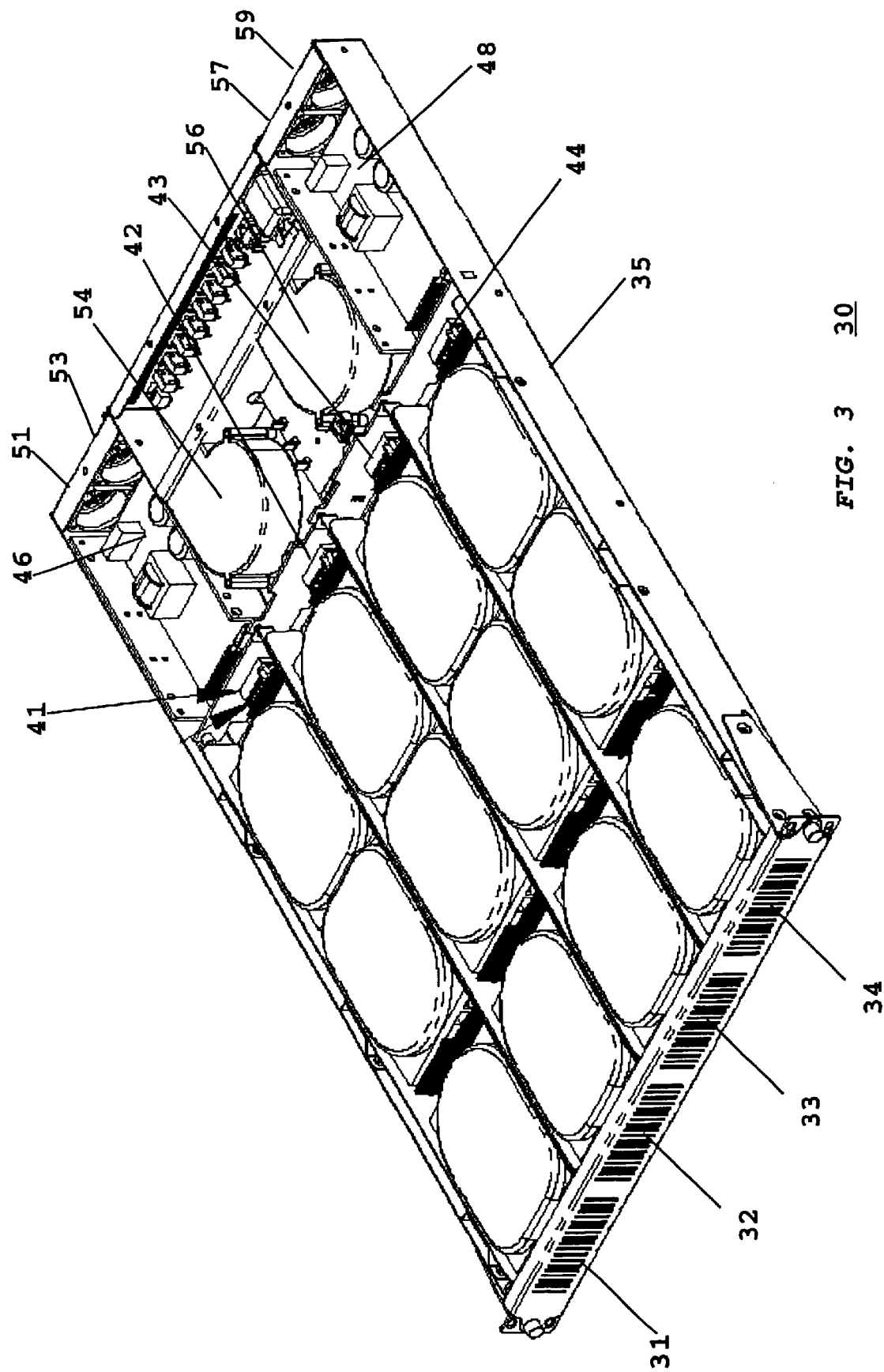
FIG. 3 illustrates an isometric view of another data storage system in accordance with the present invention.

FIG. 3 illustrates an isometric view of a data storage system 30 in accordance with another embodiment of the present invention. Data storage system 30 includes twelve storage devices arranged in a two dimensional array. Specifically, the twelve storage devices are arranged in four columns, each column having three storage devices. In other words, data storage system 30 includes four sets of storage devices, which are shown in FIG. 3 as sets 31, 32, 33, and 34. Each set includes three storage devices mounted on a tray and is structurally similar to data storage system 10 shown in FIG. 1. Data storage system 30 also includes a chassis 35 having four slots. Each of storage device sets 31, 32, 33, and 34 is removably installed in a corresponding slot in chassis 35. When mounted in corresponding slots, sets 31, 32, 33, and 34 of storage devices form four columns of storage devices substantially coplanar and parallel to each other.

Data storage system 30 also includes data accessing circuits 41, 42, 43, and 44 coupled to sets 31, 32, 33, and 34, respectively, of storage devices. Data accessing circuits 41, 42, 43, and 44 serve to access the data in respective sets 31, 32, 33, and 34 of storage devices. Power supply circuits 46 and 48 supply operating power to sets 31, 32, 33, and 34 of storage devices. Data storage system 30 further includes a plurality of fans mounted on chassis 35 near the back ends of the storage device sets 31, 32, 33, and 34 in corresponding slots. Specifically, FIG. 3 shows fans 51, 53, 57, and 59 on the back end of chassis 35, and suction fans 54 and 56 adjacent the back ends of storage device sets 32 and 33 in respective slots of chassis 35. The front end of chassis 35 has openings for sliding in the trays and for airflows. The top (not shown in FIG. 3), bottom, and sidewalls of chassis 35 enclose the trays and fans, thereby by forming an airflow tunnel. In operation, the airflow generated by suction fans 54 and 56 and fans 51, 53, 57, and 59 forms high speed airflows in the air channels in the four trays because of the small cross section areas of the air channels, as shown in FIG. 2. Furthermore, the airflow generated by fans 51, 53, 57, and 59 also flows through power supply circuits 46 and 48, dissipating the heat generated therein.

Because of the high speed airflows flowing through the air channels, data storage system 30 has a high heat dissipation efficiency. This is beneficial when accessing multiple storage devices in data storage device 30 simultaneously. For example, heat generation is usually a problem when access data in a high speed and large capacity hard disk drive. Simultaneously accessing data in multiple hard disk drives in close proximity with each other significantly aggravates the heat generation problem. However, the small cross section area air channels (shown in FIG. 2) in accordance with the present invention enable even a relatively low speed fan to generate high speed airflows in the air channels. The high speed airflows significantly increase the heat dissipation efficiency. Therefore, the multiple storage devices in data storage system 30 can be accessed simultaneously without overheating the storage devices.

In accordance with an embodiment of the present invention, data storage system 30 functions as a memory module, which is also referred to as data storage board or a memory board. As described herein above with reference to FIGS. 1 and 2, the thickness of each memory board can be as little as one rack unit or less. A memory system may include multiple memory modules. For example, a memory system may include severally memory boards mounted on a rack overlying each other. This creates a compact and high capacity data storage system. In accordance with an embodiment of the present invention, each storage device in data storage system 30 is a hard disk drive having a memory capacity of 160 giga-bytes (GB). Accordingly, data storage system 30 has a memory capacity of 1.92 tera-bytes (TB). A memory system comprised of six memory boards, each having 1.92 TB of memory capacity like system 30, will have a memory capacity of 11.52 TB. This memory is equivalent to approximately eleven thousand hours of broadcasting quality digital video programs in MPEG-2 format.

It should be understood that the structure of data storage system 30 in accordance with the present invention is not limited what is described herein above with reference to FIG. 3. For example, the storage devices in data storage system 30 are not limited to being hard disk drives. Data storage system 30 may include any kind of data storage devices or medium, e.g., tape drives, CD drives, DVD drives, MD drives, etc. In addition, data storage system 30 is not limited to having twelve storage devices the storage device divided into four sets, each set with three storage devices. Depending on the sizes of the storage devices and desired dimension of chassis 35, data storage system 30 may include any number of storage devices, divided into any number of sets. Furthermore, the slots in chassis 35 are not limited to being coplanar with each other. Chassis 35 may include slots on multiple layers overlying each other.

Figure 4:
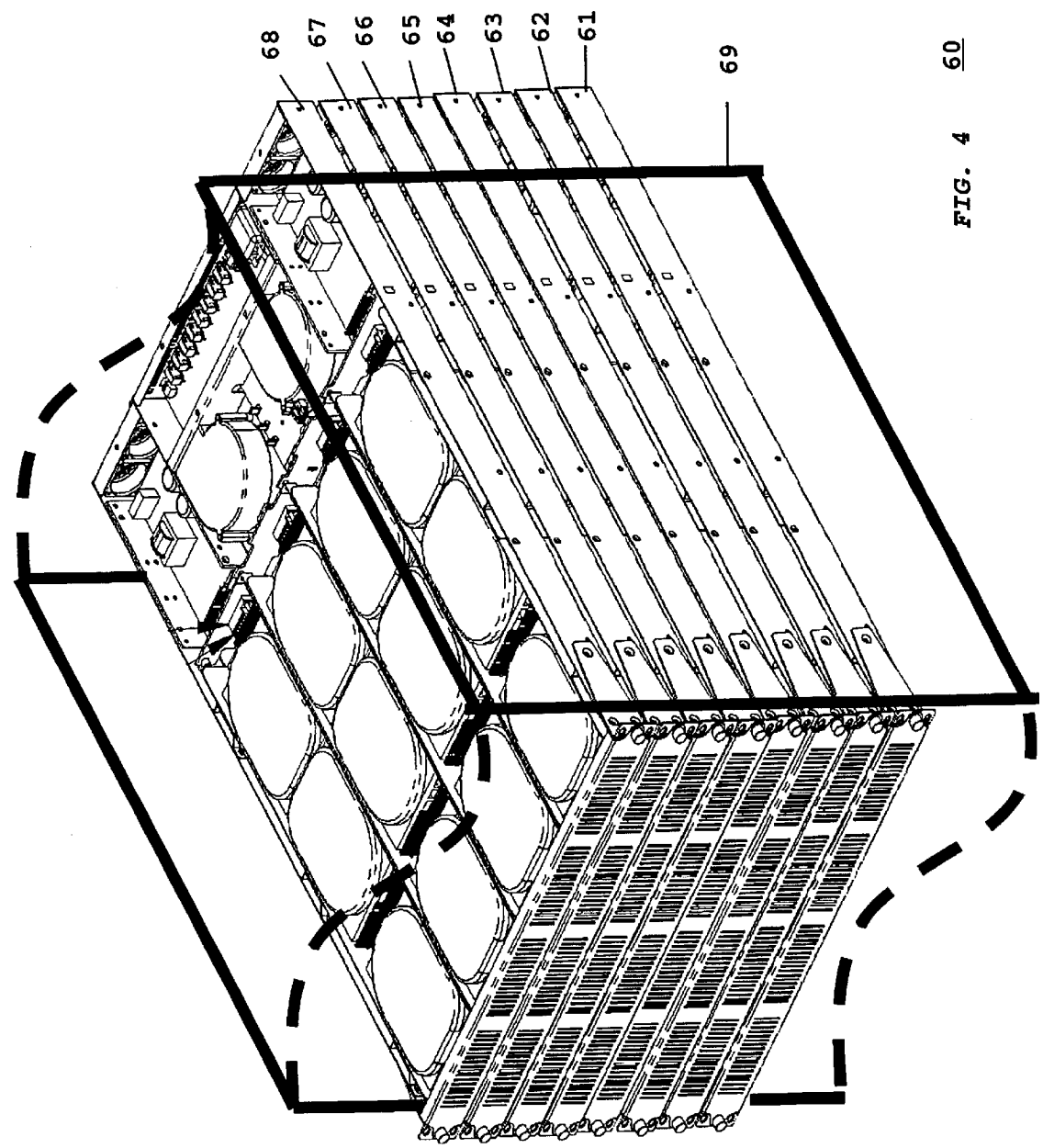
FIG. 4 illustrates yet another data storage system in accordance with the present invention.

FIG. 4 illustrates a data storage system 60 in accordance with yet another embodiment of the present invention. Data storage system 60 includes a plurality of memory boards. By way of example, FIG. 4 shows data storage system 60 including eight memory boards 61, 62, 63, 64, 65, 66, 67, and 68. However, this is not intended as a limitation on the scope of the present invention. Memory boards 61, 62, 63, 64, 65, 66, 67, and 68 are stacked on top of each other and mounted on a rack 69.

By way of example, each memory board in data storage system 60 includes twelve storage devices arranged in four columns and is structurally similar to that described herein above with reference to FIG. 3. Therefore, data storage system 60 includes ninety-six storage devices arranged in a three dimensional array. The array has eight layers, with each layer having four columns and each column has three storage devices. The three storage devices in each column are substantially aligned with each other and mounted on a tray. The four trays in each layer are mounted in four slots in a chassis, forming a memory board. The trays in a memory board are substantially parallel and coplanar with each other. Airflow generators are mounted adjacent the back ends of the chassis for generating airflows in the air channels in the tray, thereby dissipating heat generated by the storage devices in operation. The memory boards are mounted on rack 69 as shown in FIG. 4, forming data storage system 60.

It should be understood that the structure of data storage system 60 in accordance with the present invention is not limited what is described herein above with reference to FIG. 4. For example, data storage system 60 is not limited to having eight memory boards, with each memory board comprised of twelve storage devices the storage device divided into four sets, each set with three storage devices. Depending on the sizes of the storage devices and desired capacity and dimension of rack 69, data storage system 60 may include any number of memory boards, with each memory board comprised of any number of storage devices, divided into any number of columns.

It should also be understood that, in accordance with the present invention, data storage system 60 might include additional components mounted on rack 69. For example, a digital signal processing unit (not shown in FIG. 4) may be mounted on rack 69. The digital signal process unit may include a digital signal process (DSP), a microprocessor ($\mu$P), a central processing unit (CPU), etc. The digital signal processing unit processes the data to be written into data storage system 60 and the data read from data storage system 60. In accordance with a specific embodiment of the present invention, a general purpose computer unit (not shown in FIG. 4) is mounted on rack 69 for processing the data read from data storage system 60 and the data to be written into data storage system 60.

Figure 5:
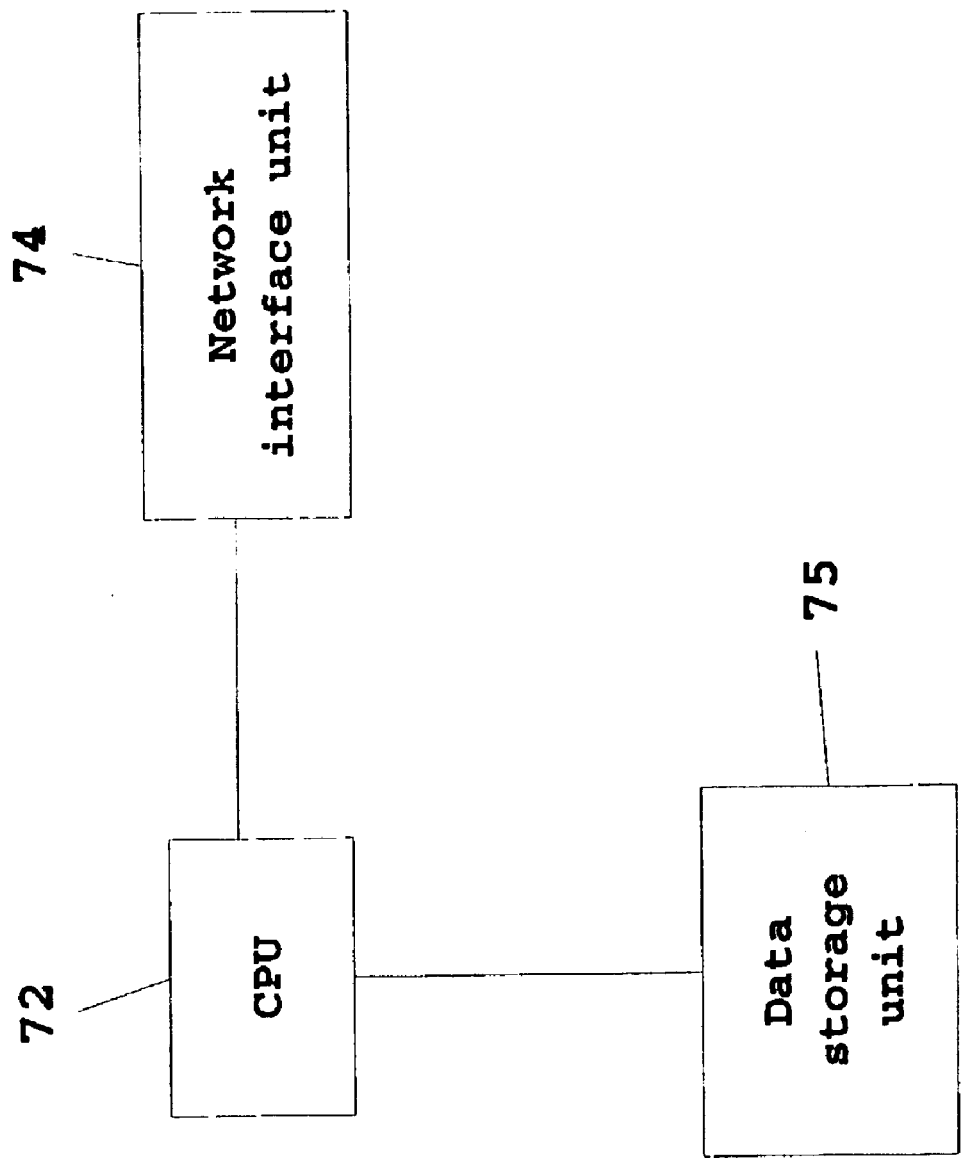
FIG. 5 illustrates a network server in accordance with the present invention.

FIG. 5 is a block diagram illustrating a network server 70 in accordance with the present invention. Network server 70 includes a digital signal processing unit 72. By was of example, FIG. 5 shows digital signal process unit 72 being a CPU of a general purpose computer. A network interface 74 is coupled to CPU 72 for transmitting signals between CPU 72 and a network, e.g., a wide area network (WAN), a local area network (LAN), a wireless network, etc. Network server 70 also includes a data storage unit 75. In accordance with the present invention, data storage unit 75 includes a data storage system comprised of multiple storage devices arranged in an array.

In accordance with one embodiment of the present invention, data storage unit 75 includes a memory unit having a structure similar to that described herein above with reference to FIGS. 1 and 2. In accordance with another embodiment, data storage unit 75 includes a memory board having a structure similar to that described herein above with reference to FIG. 3. In accordance with yet another embodiment, data storage unit 75 includes multiple memory boards, each having a structure similar to that described herein above with reference to FIG. 4.

By now it should be appreciated that a data storage system that has a large data storage capacity has been provided. A data storage system in accordance with the present invention is compact and lightweight. A data storage system in accordance with the present invention may have a high data access rate. In addition, a data storage system in accordance with the present invention is simple, reliable, and cost efficient. Specifically, a data storage system in accordance with the present invention includes an array of data storage devices mounted on one or more trays. The storage devices on each tray form one column of the array. The array may include any number of columns of storage devices. The storage devices and the tray form a narrow channel, through which air can flow, thereby providing efficient cooling or heat dissipation of the storage devices. Thanks to the efficient heat dissipation, the multiple storage devices in the data storage system can be accessed simultaneously to provide high speed data access.

While specific embodiments of the present invention have been described herein above, they are not intended as a limitation on the scope of the present invention. The present invention encompasses those modifications and variations of the described embodiments that are obvious to those skilled in the art. For example, a data storage system in accordance with the present invention may include redundant arrays of independent disks (RAID) to increase its fault tolerance and reliability. Furthermore, a data storage system in accordance with the present invention is applicable not only in a network server, but also in any applications that can benefit from large and economical memory capacities.

What is claimed is:

1. A data storage system, comprising:
   a having:
      a first opening, a second opening, a third opening, and a fourth opening substantially and parallel to each other; and
      a fifth, a sixth, a seventh, and an eighth openings substantially parallel and coplanar with each other, and overlying the first, second, third, and fourth openings, respectively;
   a first tray mounted in the first opening of said chassis and having a first end and a second end, a first sidewall and a second sidewall extending between the first end and the second end and opposite to each other, and a surface between the first sidewall and the second sidewall; and
   a first storage device, a second storage device, and a third storage device mounted on said first tray between the first sidewall and the second sidewall, substantially coplanar with each other, and having a major surface in proximity to the surface of said first tray, forming a first air channel there between;
   a second storage unit removably mounted in the second opening of said chassis and comprising:
      a second, a third, and a fourth trays mounted in the second, third, and fourth openings, respectively, of said chassis;
      a fourth, a fifth, and a sixth storage devices mounted on said second tray and defining a second air channel there between;
      a seventh, an eighth, and a ninth storage devices mounted on said third tray and defining a third air channel there between;
      a tenth, an eleventh, and a twelfth storage devices mounted on said fourth tray and defining a fourth air channel there between;
      a fifth, a sixth, a seventh, and an eighth, trays mounted in the fifth, sixth, seventh, and eighth openings, respectively, of said chassis;
      a thirteenth, a fourteenth, and a fifteenth storage devices mounted on said fifth tray;
      a sixteenth, a seventeenth, and an eighteenth storage devices mounted on said sixth tray;
      a nineteenth, a twentieth, and a twenty-first storage devices mounted on said seventh tray; and
      a twenty-second, a twenty-third, and a twenty-fourth storage devices mounted on said eighth tray.

2. The data storage system of claim 1, wherein said first storage device includes a hard disk drive.

3. The data storage system of claim 1, wherein said first tray is removably mounted in the first opening of said chassis.

4. The data storage system of claim 1, further comprising an airflow generator mounted on said chassis adjacent the second end of said first tray in the first opening, said airflow generator generating an airflow in the first air channel.

5. The data storage system of claim 1, further comprising:
   data accessing circuitry, said data accessing circuitry writing data into and reading data from said first, second, third, fourth, fifth, sixth, seventh, eighth, ninth, tenth, eleventh, and twelfth storage devices;
   signal processing circuitry coupled to said data accessing circuitry, said signal processing circuitry processing data written to and data read from said first, second, third, fourth, fifth, sixth, seventh, eighth, ninth, tenth, eleventh, and twelfth storage devices;
   power supply circuitry coupled to said first, second, third, fourth, fifth, sixth, seventh, eighth, ninth, tenth, eleventh, and twelfth storage devices and mounted on said chassis; and
   a suction fan mounted on said chassis, adjacent the second ends of said first, second, third, and fourth trays in the corresponding first, second, third, and fourth opening in said chassis, said suction fan generating airflows through the first, second, third, and fourth air channels.

6. A The data storage system comprising:
   a rack including a first group of slots comprised of a first, a second, a third, and a fourth slots substantially coplanar with each other;
   a plurality of trays, each removable mounted on a corresponding slot of the first group of slots in said rack; and having a first end and a second end;
   a plural sets of storage devices, each set including three hard drives mounted between the first end and the second of a corresponding tray in said plurality of trays and forming an air channel with said corresponding tray;
   a plurality of data transmission lines coupled to said plural sets of storage devices; and
   a data access circuit coupled to said plurality of data transmission lines.

7. The data storage system of claim 6, further comprising at least one fan mounted on said rack, said at least one fan generating airflow in the air channel in each of said plurality of trays.

8. The data storage system of claim 6, the plurality of slots in said rack include a second group of slots substantially coplanar with each other and overlying the first group of slots.

* * * * *